United States Patent [19]
Bullivant et al.

[11] Patent Number: 4,738,325
[45] Date of Patent: Apr. 19, 1988

[54] HALL EFFECT WEIGHT TRANSDUCER

[75] Inventors: Kenneth W. Bullivant, Chadds Ford, Pa.; Johannes Wirth, Zurich, Switzerland

[73] Assignee: K-Tron International, Inc., Pitman, N.J.

[21] Appl. No.: 945,525

[22] Filed: Dec. 23, 1986

[51] Int. Cl.$^4$ ............................................. G01G 3/14
[52] U.S. Cl. ...................... 177/210 EM; 177/210 FP; 177/DIG. 5
[58] Field of Search ................... 177/210 FP, DIG. 5, 177/210 EM

[56] References Cited

U.S. PATENT DOCUMENTS

| | | |
|---|---|---|
| 3,060,370 | 10/1962 | Varterasian . |
| 3,164,013 | 1/1965 | Schmahl et al. . |
| 3,411,347 | 11/1968 | Wirth et al. . |
| 3,423,999 | 1/1969 | Wirth et al. . |
| 3,621,713 | 11/1971 | Wirth et al. . |
| 3,724,573 | 4/1973 | Saner . |
| 3,805,605 | 4/1974 | Saner . |
| 4,336,854 | 6/1982 | Jensen ............................. 177/212 X |
| 4,532,810 | 8/1985 | Prinz et al. . |

Primary Examiner—George H. Miller, Jr.
Attorney, Agent, or Firm—Parkhurst & Oliff

[57] ABSTRACT

A weight transducer including an extruded housing having upper and lower inner surfaces. Affixed to the upper inner surface is a hall effect magnetic field sensor, and affixed to the lower inner surface is a pair of magnetic field generating magnets. The magnets are arranged with magnetic poles of opposite polarity located adjacent one another. The hall effect sensor senses changes in the magnetic field generated by the pair of magnets due to relative movement between the upper and lower inner surfaces with application of weight to the housing. The voltage output of the hall effect sensor is converted to a signal having a frequency which varies in proportion to the weight applied to the housing. The hall effect weight transducer provides a very rugged and relatively inexpensive yet highly accurate weight transducer.

16 Claims, 4 Drawing Sheets

HALL EFFECT WEIGHT TRANSDUCER

BACKGROUND OF THE INVENTION

The invention relates to weight transducers using hall effect magnetic field sensors.

Weight transducers applied in industrial environments are required to be rugged yet highly accurate. One such known transducer is the vibrating wire-type digital mass transducer disclosed in, for example, U.S. Pat. Nos. 3,411,347; 3,423,999; 3,621,713; 3,724,573 and 3,805,605. These weight transducers are extremely accurate and stable while sensing heavy loads. For example, such transducers are capable of 0.03% accuracy or better.

However, while being highly desirable for many applications, these vibrating wire-type transducers are not without some disadvantage. Their mechanical structure renders them somewhat susceptible to physical shock impact which can damage the vibrating members, and vibrating wire-type transducers can be relatively expensive. In some applications, the coat of the weight transducer is a critical limitation, and improved shock resistance is desired.

SUMMARY OF THE INVENTION

It is thus a primary object of the present invention to provide a highly accurate weight transducer of extremely rugged design which allows real-time weight detection at a low cost.

This and other objects are accomplished by the present invention which uses a hall effect magnetic field sensor to detect changes in a magnetic field due to application of weight to the transducer.

The transducer is enclosed in a housing of extruded aluminum which serves to protect the transducer elements and also serves as a spring member for the weight transducer. The hall effect magnetic field sensor and magnetic field producing magnets are respectively connected to upper and lower inner surfaces of the housing. As the housing is deformed by applied weight, the magnets move relative to the hall sensor which, in turn, produces a variable voltage output signal indicative of the applied weight. The output signal of the hall sensor is converted from a variable voltage signal to a variable frequency signal having a frequency correlated to the applied weight. The variable frequency signal is then transmitted to a utilization device, for example a pulse counter, for determining the weight applied to the transducer.

Thus, the hall effect weight transducer according to the present invention produces a digital signal having a frequency which varies in proportion to the weight applied to the tranducer.

The magnetic field producing magnets of the present invention are supported by a magnet holder which ensures that the faces of the magnets move in a direction substantially perpendicular with the upper and lower inner surfaces of the aluminum housing. This ensures that the changes in the magnetic field sensed by the hall effect sensor are substantially linearly related to the magnitude of the weight applied to the transducer.

Other objects and features of the present invention will become apparent to those skilled in the art from the following detailed description with reference to the drawings.

DETAILED DESCRIPTION OF THE PREFERRED EMBODIMENT

Figure 1:
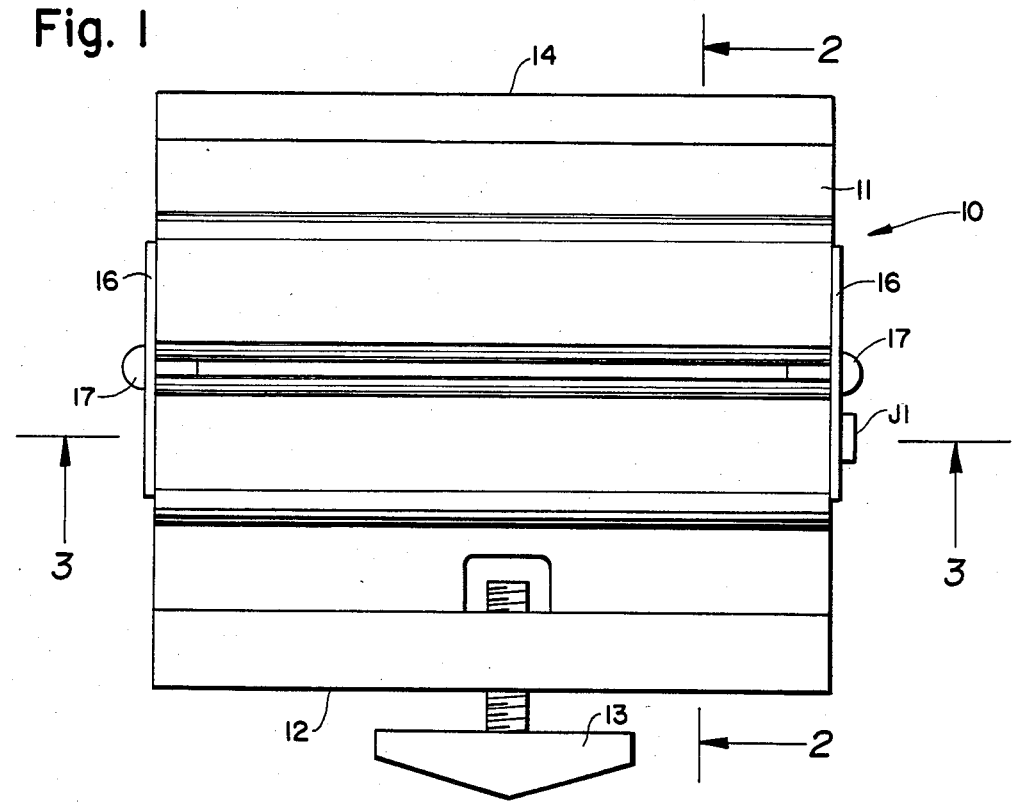
FIG. 1 is a side view of a weight transducer according to the present invention.

FIG. 1 is a side view of the exterior mechanical details of a weight transducer 10 according to the present invention. Transducer 10 comprises housing 11 made of extruded aluminum, for example, type 6063-T6 aluminum. Connected to lower exterior surface 12 of housing 11 is foot 13 which can be an adjustable foot to allow levelling of an apparatus to which housing 11 is connected. Such an apparatus can be connected to upper exterior surface 14 of housing 11.

Thus, transducer 10 can be used to detect a weight of an apparatus attached to surface 14 when foot 13 rests on a substantially horizontal surface.

Transducer 10 also includes end plates 16 which are attached to housing 11 with attachment means 17, for example, screws. End plates 16 are slightly bowed so as not to interfere with the movement of the surfaces of housing 11 due to applied weight. Electrical connector J1 is provided in one end plate 16 to allow electrical connection to the electrical circuitry contained within housing 11.

Figure 2:
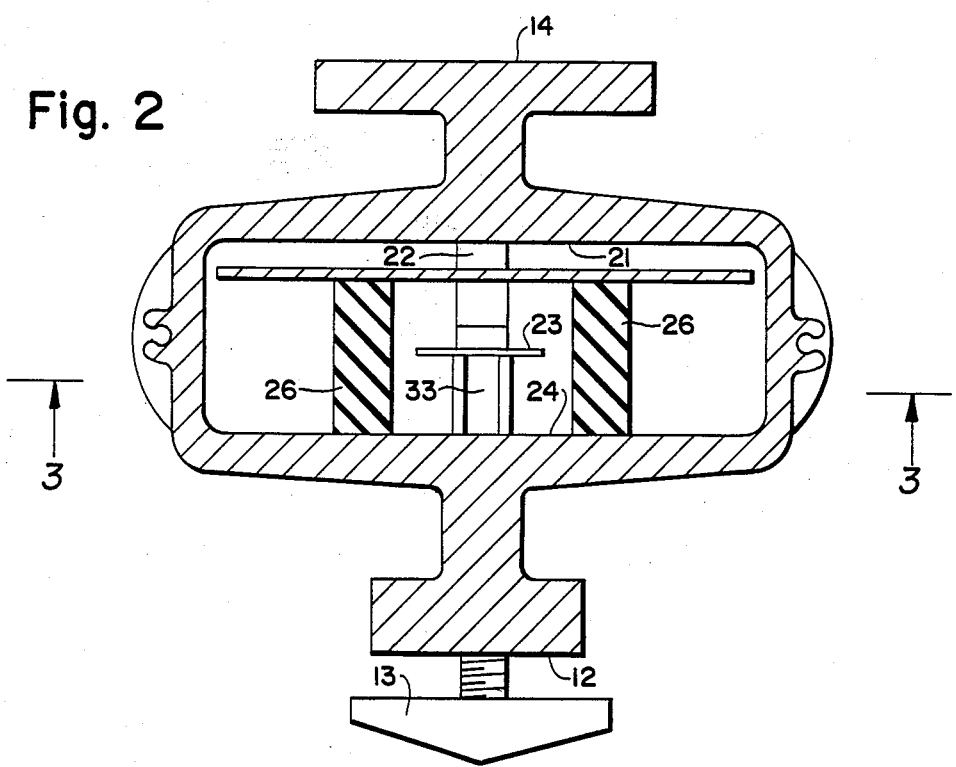
FIG. 2 is a sectional view of the weight transducer of FIG. 1.
Figure 3:
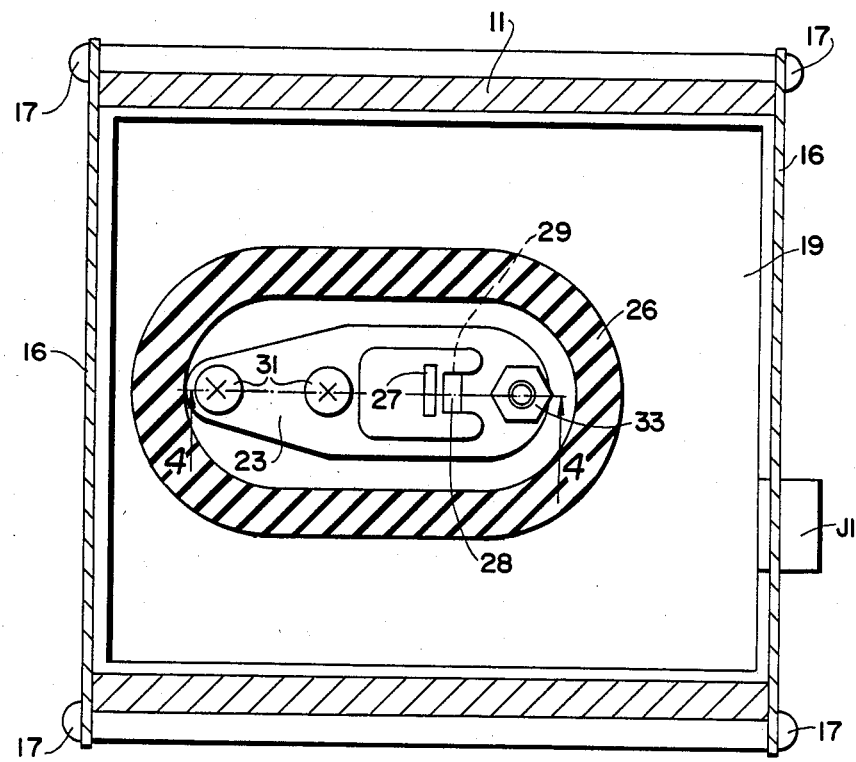
FIG. 3 is another sectional view of the weight transducer of FIG. 1.

FIG. 2 is a view taken through section 2—2 of FIGS. 1 and 3. Within housing 11 is printed circuit board 19 which is fixedly mounted to upper inner surface 21 of housing 11 by nut plate 22 and screws (shown in FIGS. 3 and 4). Mounted to printed circuit board 19 is one end of magnetic holder 23, shown in detail in FIGS. 4 and 6. A second end of magnet holder 23 is fixedly mounted to lower inner surface 24 of housing 11 by spacer 33. Surrounding magnet holder 23 and abutting both printed circuit board 19 and lower inner surface 24 is resilient dust shield 26 made from, for example, polyurethane foam. Dust shield 26 protects the mechanical components of the transducer.

FIG. 3 is a view taken through section 3—3 of FIGS. 1 and 2. Hall effect sensor 27 is fixedly mounted to printed circuit board 19. Magnets 28 and 29 are fixed to magnet holder 23 by, for example, glue or the like. Screws 31 fix a first end of magnet holder 23 to upper inner surface 21 of housing 11. Screw 32 (shown in FIG. 4) fixes a second end of magnet holder 23 through spacer 33 to lower inner surface 24 of housing 11.

Figure 4:
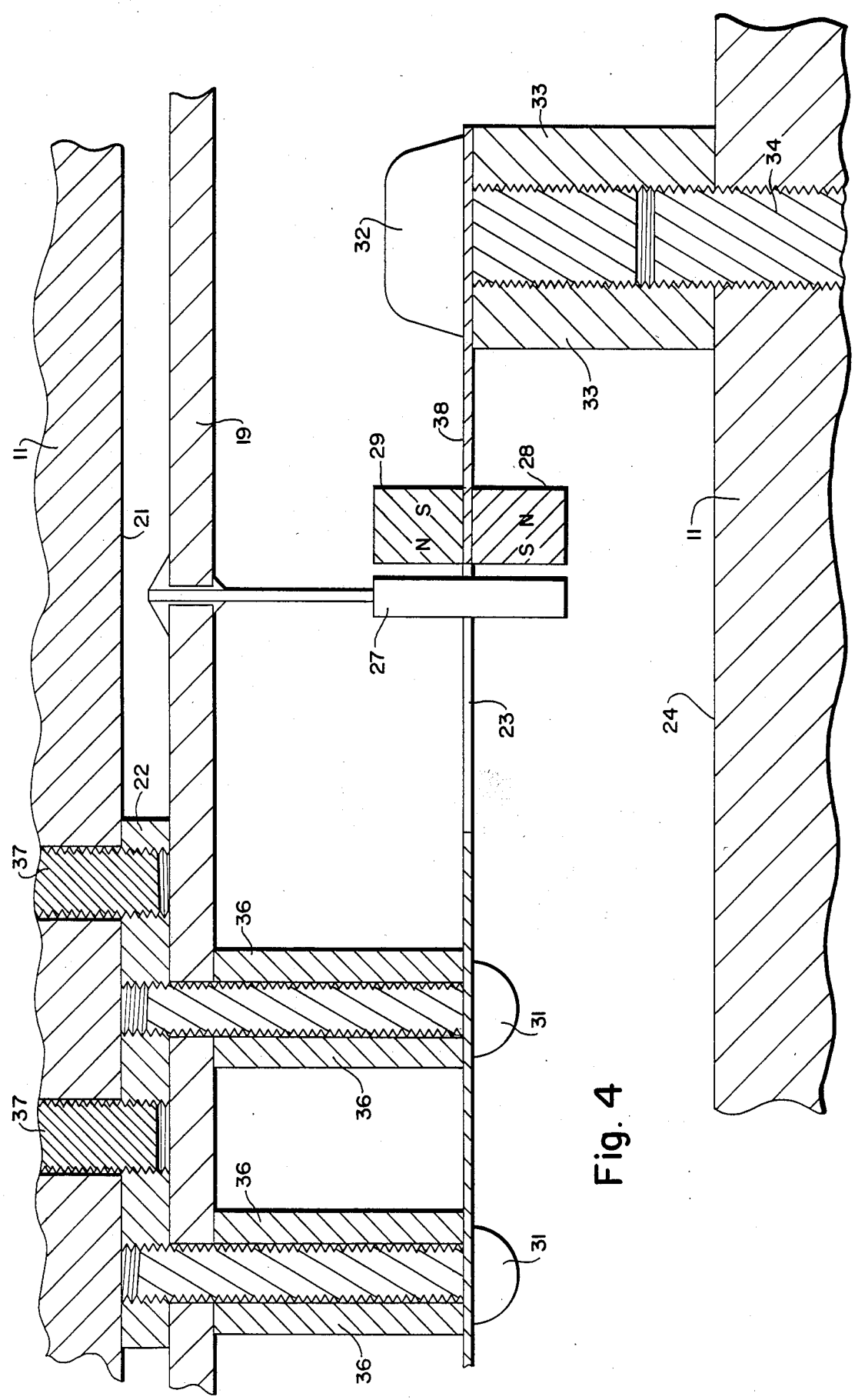
FIG. 4 is yet another sectional view of the weight transducer of FIG. 1 showing the details of the mechanical relationship between the magnetic field sensor and field producing magnets.

Referring now to FIG. 4, a detailed cross-sectional view of the mounting of sensor 27 and magnets 28 and 29 is shown. Magnets 28 and 29 which are arranged as shown with opposite magnetic polarity are each affixed to opposite sides of cantilevered portion 38 of holder 23. Magnets 28 and 29 are preferably rare earth magnets, for example, samarium cobalt magnets, material type 20 available from Recoma Incorporated, and each measure 3×4×2.3 mm magnetized through the 2.3 mm dimension.

The end of magnet holder 23 adjacent magnets 28 and 29 is fixed relative to lower inner surface 24 of housing 11 by screws 32 and 34 with spacer 33. The other end of magnet holder 23 is fixed to printed circuit board 19 by screws 31, spacers 36 and nut plate 22. Nut plate 22 is fixed to upper inner surface 21 of housing 11 by screws 37. Hall effect magnetic field sensor 27 is preferably a type 8SSAE1 hall effect sensor available from Microswitch a division of Honeywell.

Thus, hall sensor 27 is fixed relative to upper inner surface 21 of housing 11, and magnets 28 and 29 are fixed relative to lower inner surface 24 of housing 11. When weight is applied to housing 11, surfaces 21 and 24 move closer to each other thereby causing sensor 27 to move relative to magnets 28 and 29. In the weight transducer of the present invention, sensor 27 moves approximately 0.015 inches with application of weight of 450 Kg to housing 11.

Figure 5:
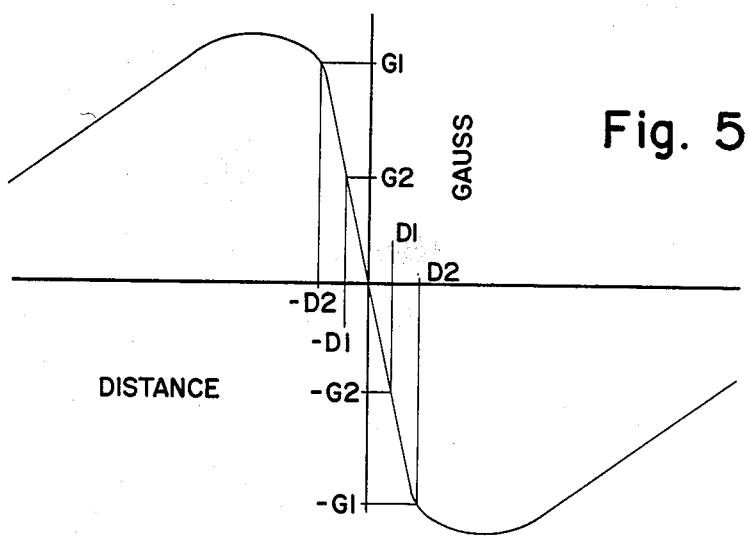
FIG. 5 is a graph of the second magnetic field of the present invention.

Referring now to FIG. 5, the magnetic field generated by magnets 28 and 29 of FIG. 4 is shown as a function of distance from the center line of cantilevered portion 38 of magnet holder 23 (i.e., the center of magnets 28 and 29.) As can be seen, a substantially linear relationship exists for distances of less than $+/- D2$ from the center line of cantilevered portion 38. In addition, the preferred hall effect sensor produces an output voltage which varies in direct proportion to the intensity of the magnetic field with an appropriate offset. Thus, sensor 27 produces an output voltage which has a shape which is substantially similar to that shown in FIG. 5. This output voltage exhibits a linear relationship between voltage and displacement when the displacement is less than distance D2. In the preferred embodiment, this linear relationship exists when the hall effect element within sensor 27 is within approximately 0.10 inches of the center line of cantilevered portion 38 of magnet holder 23. Since, as mentioned above, the total excursion of sensor 27 relative to magnets 28 and 29 is approximatey 0.015 inches, a substantially linear relationship between the output voltage of the sensor 27 and the relative distance between sensor 27 and magnets 28 and 29 is assured. Any nonlinearities are compensated for by adjustment procedures during transducer calibration described below.

The preferred senosr incorporates an appropriate offset such that the sensor produces a null voltage signal, corresponding to sensing no magnetic field, of approximately one-half of the supply voltage applied to the sensor.

Figure 6:
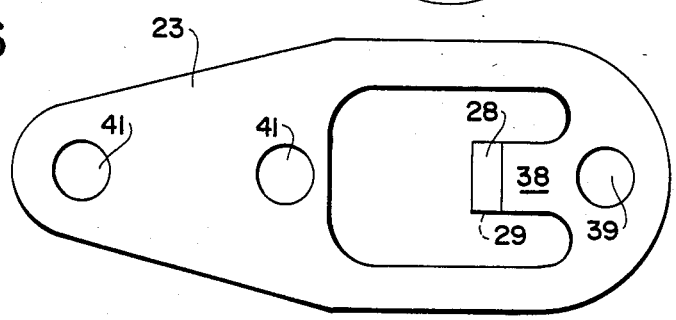
FIG. 6 is the magnet holder of the present invention.

Refering now to FIGS. 4 and 6, the details of the magnet holder used in the present invention are shown. The magnet holder is made of resilient material, for example, spring steel. Magnets 28 and 29 are affixed to holder 23 at the end of the cantilevered portion 38. At the base of cantilevered portion 38 is hole 39 which accepts screw 32. Magnet holder 23 also contains holes 41 which accept screws 31.

In practice, hole 39 remains substantially coplanar with cantilevered portion 38, and holes 41 remain substantially coplanar with each other. The plane containing hole 39 and cantilevered portion 38 is either coplanar with or parallel to the plane containing holes 41. Thus, as inner surfaces 21 and 24 move relative to each other with application of weight to housing 11, the surfaces of the magnets 28 and 29 adjacent sensor 27 remain substantially perpendicular to surfaces 21 and 24 and substantially parallel to the surface of sensor 27, which further improves the linearilty of the relationship of the output voltage produced by sensor 27 relative to the displacement between sensor 27 and magnets 28 and 29.

Figure 7:
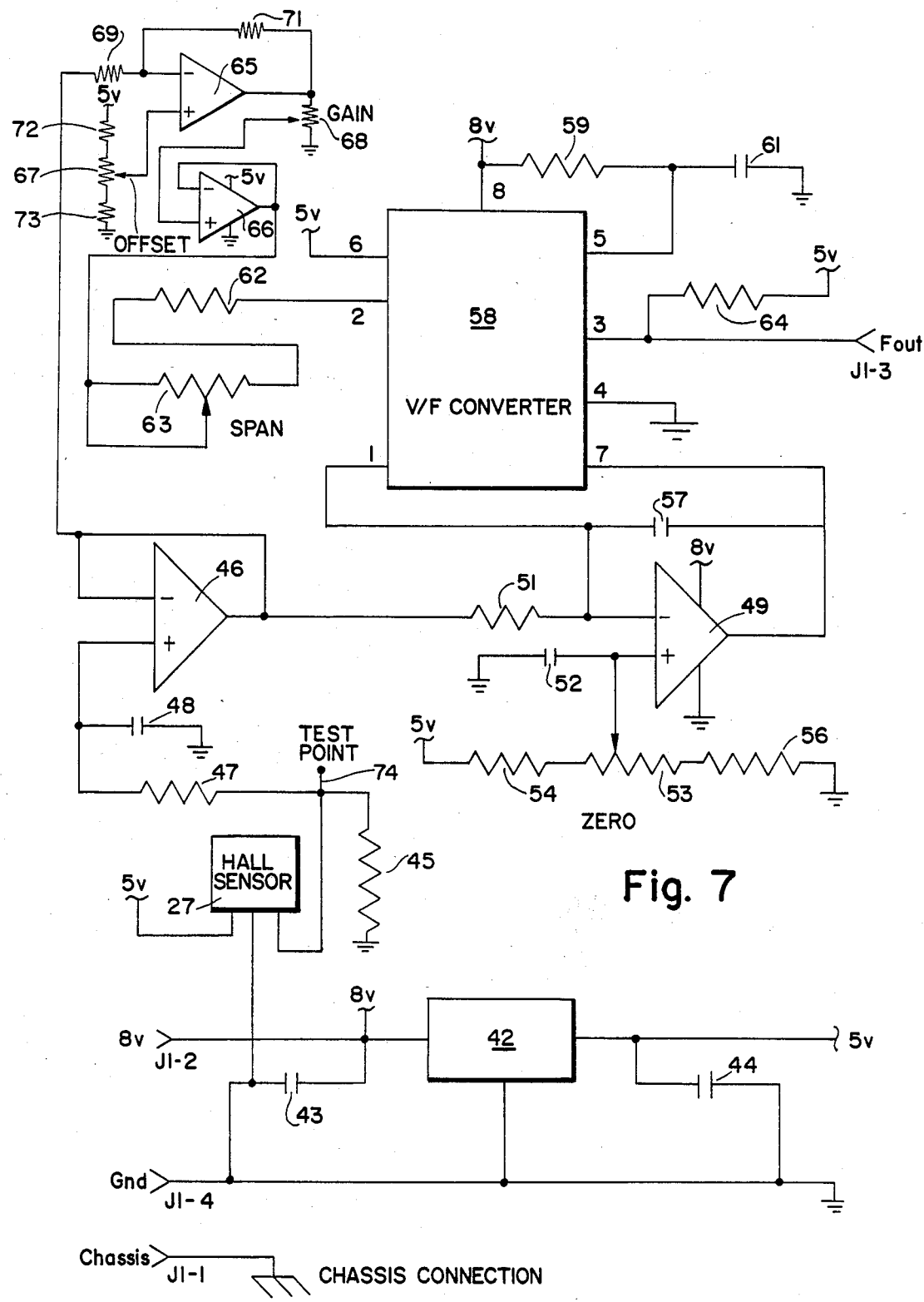
FIG. 7 is the electrical schematic of the present invention.

Although not shown in the previous figures, printed circuit board 19 has electrical circuitry mounted thereon in addition to sensor 27. A schematic of the electrical circuitry used in the present invention and mounted on board 19 is shown in FIG. 7. Referring to FIG. 7 connector J1 is a four-conductor connector with three conductors (J1-2, J1-4 and J1-1) supplying power of eight Volts, signal ground and chassis ground, respectively. The fourth conductor (J1-3) carries a digital signal comprising a stream of pulses. The frequency of the signal on conductor J1-3 varies in proportion to the weight applied to housing 11.

The eight Volt power supply from connector J1 is applied to voltage regulator 42 to produce a five volt regulated power supply. Voltage regulator 42 can be, for example, a type 78L05 regulator available from National Semiconductor Corporation. Input and output filtering is provided by capacitors 43 and 44.

The five Volt regulated supply is applied to hall effect sensor 27, the output of which is connected to ground through resistor 45 and to operational amplifier 46 through resistor 47 and capacitor 48 which provide low-pass filtering of the voltage produced by sensor 27. Operational amplifier 46 is configured as a non-inverting voltage follower with an output connected to the inverting input of operational amplifier 65 through resistor 69 and to the inverting input of operational amplifier 49 through resistor 51. Connected to the non-inverting input of amplifier 49 is capacitor 52 and the wiper of potentiometer 53. Potentiometer 53 is also connected to the regulated supply of five Volts through resistor 54 and to ground through resistor 56. Potentiometer 53 is used, as described below, to calibrate the zero point of the weight transducer.

Connected between the output of amplifier 49 and its inverting input is feedback capacitor 57. Operational amplifiers 46 and 49 can be, for example, type TLC272 operational amplifiers available from Texas Instruments Corporation.

The output of operational amplifier 49 is a DC voltage which varies in proportion to the weight applied to housing 11. This DC voltage is applied to voltage-to-frequency (V/F) converter 58 which can be, for example, a type LM331A voltage-to-frequency converter available from National Semiconductor Corporation. The numbers appearing adjacent the connections of V/F converter 58 correspond to the package pin numbers of the preferred converter.

Resistor 59 and capacitor 61 are timing components which aid in relating the frequency of the output of converter 58 to the input voltage. Resistor 62 and potentiometer 63 are calibration components used, as described below, to adjust the frequency span of the transducer. A variable frequency pulse train is provided on conductor J1-3 which is also connected to the five Volt regulated supply through pull-up resistor 64.

Operational amplifiers 65 and 66 together with potentiometers 67 and 68 form a linearization circuit which serves to further improve the linear relationship between the magnitude of the weight applied to transducer 10 and the frequency of the digital signal on conductor J1-3. Operational amplifiers 65 and 66 can be, for example, type TLC272 operational amplifiers available from Texas Instruments Corporation.

The output of operational amplifier 46 is applied through resistor 69 to the inverting input of amplifier 65. Negative feedback is provided with resistor 71. The non-inverting input of amplifier 65 is connected to the wiper of offset potentiometer 67. Potentiometer 67 is connected to the five volt regulated supply through resistor 72, and to ground through resistor 73.

The output of amplifier 65 is connected to ground through gain potentiometer 68, the wiper of which is connected to the non-inverting input of amplifier 66 configured as an non-inverting voltage follower. The output of amplifier 66 is connected to span potentiometer 63.

The function of the linearization circuit will now be explained. With potentiometer 68 adjusted so that the output of amplifier 66 holds the end of span potentiometer 63 at ground (i.e., the wiper of gain potentiometer 68 is positioned at ground), and with no weight applied to the transducer, test point 74 is monitored while shims are used to adjust the position of magnets 28 and 29 relative to sensor 27 (FIG. 4), until an output voltage of approximately one-half of the sensor supply voltage is measured at test point 74. This ensures that the transducer will operate near the zero Gauss point of FIG. 5. Next, the linearity of the relationship of applied weight to output frequency is determined by loading the transducer with several different gross weights, and then perturbing the load with a predetermined incremental weight. The change in output frequency due to the addition of the predetermined incremental weight at each gross weight (df/dw) is then noted to determine the slope of the frequency/weight relationship at each gross weight.

For example, the transducer can be loaded with five different gross weights of 0, 50, 100, 150 and 200 Kg. The change in output frequency (df) due to the addition of an incremental weight of 2 Kg (dw) is then noted at each of the five gross weights.

After assessment of the non-linearity of the relationship of output frequency to applied weight, offset potentiometer 67 and gain potentiometer 68 are adjusted to correct the measured non-linearity.

Adjustment of offset potentiometer determines at what weight linearization will become effective, and adjustment of gain potentiometer 68 determines the degree of linearization. Thus, the linearization circuit, comprising operational amplifiers 65 and 66 and potentiometers 67 and 68, provides an approximately piecewise linear correction for the nonlinearities existing between the output frequently and applied weight.

Calibration potentiometers 53 and 63 and linearization potentiometers 67 and 68 are mounted adjacent the edge of printed circuit board 19 (see FIGS. 1 and 3) so as to be accessible through an opening provided in end plate 16 during transducer linearization and final calibration. After final assembly, the output frequency of the transducer is again monitored with no weight applied to housing 11. Zero potentiometer 53 is then adjusted until the frequency of the signal on conductor J1-3 is between 1 and 10 kHz. Housing 11 is then loaded with a calibrated weight of 450 Kg and span potentiometer 63 is adjusted so that the output frequency of the weight transducer is 90 kHz above the zero point set by zero potentiometer 53. The weight trasducer is thus calibrated to produce a change in output frequency of 1 Hz for every 5 g change in weight applied to housing 11.

Conductor J1-3 is typically connected to a utilization device including a frequency counter. In order to detect a change in frequency of 1 Hz (5 g) it is necessary to count the pulse stream on conductor J1-3 for one second. Accuracy of 10g can be realized by sampling the output frequency for 0.5 seconds. Accuracy of 20 g can be realized by sampling the output frequency for 0.25 seconds, and so forth.

While the present invention has been disclosed with reference to a preferred embodiment, those skilled in the art may make changes to the disclosed preferred embodiment without departing from the spirit and scope of the invention. For example, the preferred embodiment produces a digital pulse stream having a frequency which varies in direct linear proportion to the weight applied to the weight transducer. However, it is to be understood that other relationships may exist between the output frequency and the applied weight as long as there is a predetermined correlation between the two.

What is claimed is:

1. A weight transducer comprising:
    a housing having first and second spaced apart members, said members being relatively movable in response to application of a weight to said housing;
    magnetic field generating means, located within said housing and being substantially fixed relative to said first member;
    magnetic field sensing means, located within said housing in said magnetic field and being substantially fixed relative to said second member, for producing a first signal having a magnitude related to a magnitude of said magnetic field; and
    voltage to frequency converter means for converting said first signal to a second signal having a frequency related to said first signal;
    whereby said frequency of said second signal varies in relation to said weight applied to said housing.

2. A weight transducer as recited in claim 1 wherein said magnetic field sensing means comprises a hall effect sensor.

3. A weight transducer comprising:
    a housing having first and second spaced apart members, said members being relatively moveable in response to application of a weight to said housing;
    magnetic field generating means, located within said housing and being substantially fixed relative to said first member, said magnetic field generating means comprising first and second magnets, a pole of said first magnet being located adjacent a pole of opposite polarity of said second magnet;
    magnetic fields sensing means, located within said housing in said magnetic field and being substantially fixed relative to said second member, for producing a first signal having a magnitude related to a magnitude of said magnetic field; and
    signal converter means for converting said first signal into a second signal which varies in relation to said weight applied to said housing.

4. A weight transducer as recited in claim 3 wherein said pole of said first magnet and said pole of opposite polarity of said second magnet from a substantially planar face of said magnetic field generating means located adjacent said magnetic field sensing means.

5. A weight transducer as recited in claim 4 further comprising:

a magnet holder having:
- a first portion, including a cantilevered portion affixed to said magnets, substantially fixed relative to said first member; and
- a second portion substantially fixed relative to said second member;
- said first and second portions remaining substantially parallel with each other when said first and second members move relative to each other.

6. A weight transducer comprising:
- a housing having first and second spaced apart members, said members being relatively moveable in response to application of a weight to said housing, said housing comprising a hollow extruded member, and said first and second spaced apart members comprising substantially parallel planar first and second inner surfaces, respectively, of said housing;
- magnetic field generating means, located within said housing and being substantially fixed relative to said first member;
- magnetic field sensing means, located within said housing in said magnetic field and being substantially fixed relative to said second member, for producing a first signal having a magnitude related to a magnitude of said magnetic field; and
- signal converter means for converting said first signal into a second signal which varies in relation to said weight applied to said housing.

7. A weight transducer as recited in claim 6 wherein said magnetic field generating means comprises:
- first and second magnets, a pole of said first magnet being located adjacent to a pole of opposite polarity of said second magnet, said pole of said first magnet and said pole of opposite polarity of said second magnet together forming a substantially planar face of said magnetic field generating means located adjacent said magnetic field sensing means, said planar face being substantially perpendicular to said first and second inner surfaces of said housing.

8. A weight transducer as recited in claim 5 further comprising:
- a magnet holder having:
  - a first portion, including a cantilevered portion affixed to said magnets, and being substantially fixed relative to said first inner surface of said housing; and
  - a second portion substantially fixed relative to said second inner surface of said housing;
  - said first and second portions remaining substantially parallel to each other and to said first and second inner surfaces when said first and second inner surfaces move relative to each other.

9. A weight transducer comprising:
- a housing having first and second spaced apart members, said members being relatively moveable in response to application of a weight to said housing, said housing comprising a hollow extruded member, and said first and second spaced apart members comprising substantially parallel planar first and second inner surfaces, respectively, of said housing;
- magnetic field generating means, located within said housing and being substantially fixed relative to said first member;
- magnetic field sensing means comprising a hall effect sensor, located within said housing in said magnetic field and being substantially fixed relative to said second member, for producing a first signal having a magnitude related to a magnitude of said magnetic field; and
- signal converter means for converting said first signal into a second signal which varies in relation to said weight applied to said housing.

10. A weight transducer as recited in claim 9 wherein said hall effect sensor is mounted to a printed circuit board fixed to said second inner surface of said housing.

11. A weight transducer as recited in claim 10 wherein said voltage to frequency converter means is mounted on said printed circuit board.

12. A weight transducer as recited in claim 10 further comprising:
- dust shield means located between said printed circuit board and said first inner surface of said housing, and surrounding said hall effect sensor and said magnetic field gernerating means.

13. A weight transducer comprising:
- a housing having first and second spaced apart members, said members being relatively moveable in response to application of a weight to said housing;
- magnetic field generating means, located within said housing and being substantially fixed relative to said first member;
- magnetic field sensing means, located within said housing in said magnetic field and being substantially fixed relative to said second member, for producing a first signal having a magnitude related to a magnitude of said magnetic field; and
- voltage to frequency converter means, including means for low-pass filtering said first signal, for converting said first signal to a second signal having a frequency related to said first signal;
- whereby said frequency of said second signal varies in relation to said weight applied to said housing.

14. A weight transducer as recited in claim 13 wherein said voltage to frequency converter means further comprises calibration means including:
- means for adjusting said frequency of said second signal to a first predetermined frequency when no weight is applied to said housing; and
- means for adjusting said frequency of said second signal to a second predetermined frequency when a predetermined weight greater than zero is applied to said housing.

15. A weight transducer as recited in claim 14 wherein said voltage to frequency converter means further comprises linearization means including:
- means for increasing or decreasing said frequency dependent upon said magnitude of said second signal.

16. A weight transducer comprising:
- an extruded housing having first and second substantially parallel planar spaced apart inner surfaces, said inner surfaces being relatively movable in response to application of a weight to said housing;
- magnetic field generating means including first and second magnets, a pole of said first magnet being located adjacent a pole of opposite polarity of said second magnet, said pole of said first magnet and said pole of opposite polarity of said second magnet together forming a substantially planar face of said magnetic field generating means, said face being substantially perpendicular to said first and second inner surfaces of said housing, said magnetic field generating means being substantially fixed relative to said first inner surface of said housing;

hall effect magnetic field sensing means, located adjacent said substantially planar face of said magnetic field generating means, and being substantially fixed relative to said second inner surface of said housing, for producing a first signal having a magnitude substantially proportional to a magnitude of said magnetic field; and voltage to frequency converter means for converting said first signal to a second signal having a frequency substantially proportional to said first signal;

whereby said frequency of said second signal varies in substantial linear proportion to said weight applied to said housing.

* * * * *